US008854575B2

(12) United States Patent
Evans

(10) Patent No.: US 8,854,575 B2
(45) Date of Patent: *Oct. 7, 2014

(54) ELECTROLUMINESCENT DISPLAYS

(75) Inventor: Christopher Miles Evans, Essex (GB)

(73) Assignee: Mflex UK Limited, Cambridge (GB)

( * ) Notice: Subject to any disclaimer, the term of this patent is extended or adjusted under 35 U.S.C. 154(b) by 1426 days.

This patent is subject to a terminal disclaimer.

(21) Appl. No.: 12/519,490

(22) PCT Filed: Dec. 14, 2007

(86) PCT No.: PCT/GB2007/004805
§ 371 (c)(1),
(2), (4) Date: Jan. 19, 2010

(87) PCT Pub. No.: WO2008/075001
PCT Pub. Date: Jun. 26, 2008

(65) Prior Publication Data
US 2010/0134723 A1   Jun. 3, 2010

(30) Foreign Application Priority Data
Dec. 16, 2006 (GB) .................................. 0625114.4

(51) Int. Cl.
*G02F 1/1335* (2006.01)
*G02F 1/1334* (2006.01)

(52) U.S. Cl.
CPC .......... *G02F 1/1334* (2013.01); *G02F 2201/44* (2013.01); *G02F 1/133603* (2013.01)
USPC .......................................................... 349/69

(58) Field of Classification Search
USPC .......................................................... 349/69
See application file for complete search history.

(56) References Cited

U.S. PATENT DOCUMENTS

| 5,843,333 | A | 12/1998 | Hakemi | |
|---|---|---|---|---|
| 6,017,468 | A * | 1/2000 | Chung et al. | 252/299.5 |
| 7,486,342 | B2 * | 2/2009 | Mathey et al. | 349/16 |
| 7,649,595 | B2 * | 1/2010 | Masutani et al. | 349/89 |
| 2002/0001052 | A1 * | 1/2002 | Kornfield et al. | 349/88 |
| 2003/0031438 | A1 * | 2/2003 | Kambe et al. | 385/122 |
| 2006/0122330 | A1 * | 6/2006 | Wu et al. | 525/127 |
| 2006/0216434 | A1 | 9/2006 | Okuyama et al. | |

(Continued)

FOREIGN PATENT DOCUMENTS

| GB | 2157015 A | 10/1985 |
|---|---|---|
| JP | 2006267131 A | 10/2006 |
| WO | WO 92/12219 A | 7/1992 |
| WO | WO 2005/121878 A | 12/2005 |

OTHER PUBLICATIONS

PCT International Search Report and Written Opinion, PCT/GB2007/004805, Jul. 29, 2008, 27 pages.
Search Report, UK Intellectual Property Office, GB0625114.4, Jun. 21, 2007, 2 pages.

(Continued)

*Primary Examiner* — Timothy L Rude
(74) *Attorney, Agent, or Firm* — Keating & Bennett, LLP

(57) ABSTRACT

A display including an electroluminescent layer, a liquid crystal layer, a barrier layer arranged between the electroluminescent layer and the liquid crystal layer to restrict migration of liquid crystal from the liquid crystal layer to the electroluminescent layer, and a first electrode and a second electrode arranged such that the electroluminescent layer and the liquid crystal layer are disposed between the first and second electrodes and arranged to apply an electric field across both the electroluminescent layer and the liquid crystal layer.

13 Claims, 3 Drawing Sheets

(56) References Cited

U.S. PATENT DOCUMENTS

| | | | |
|---|---|---|---|
| 2008/0303981 A1* | 12/2008 | Fryer et al. | 349/69 |
| 2009/0273737 A1* | 11/2009 | Zhao et al. | 349/69 |
| 2010/0134723 A1* | 6/2010 | Evans | 349/69 |
| 2011/0234084 A1* | 9/2011 | Zhao et al. | 313/483 |

OTHER PUBLICATIONS

Further Search Report under Section 17, UK Intellectual Property Office, GB0625114.4, Oct. 18, 2007, 1 page.

Official Communication issued in corresponding European Patent Application No. 07848546.3, mailed on Mar. 19, 2012.

* cited by examiner

| Resin | Type | Humidity Performance[6] | Comment |
|---|---|---|---|
| PVA | Polyvinyl alcohol | <1hr | Included for comparison |
| Neorez R600 | Polyurethane | 6+ hrs | Similar to R967 |
| Neorez R1005 | Polyurethane | 6+ hrs | |
| Neorez R440[7] | UV Curable polyurethane | 6+ hrs[8] | |
| Joncryl | Styrene Acrylic Acid | 3 hrs | |
| Emultex VV665 | Vinyl Acetate Coploymer | <1 hr | |
| Revacryl 815 | Acrylic Coploymer | ~ 2hrs | |
| Vinnapas CEF | Vinyl chloride / ethylene / vinyl ester | <4 hrs | |
| Kynar Aquatec[7] | PVDF / Acrylic Copolymer | 6 hrs | Small number of small dark spots visible at end of test |

[6] Hours at 50C / 95% RH
[7] Printed onto corona primed ITO, UV cured
[8] Hours at 65C / 90% RH

| LC/Dye | Binder | Time | Temperature | Result |
|---|---|---|---|---|
| BL006 / S428 | PVA | 1 hr | RT | No colouration |
| " | R967 | 1 hr | RT | Slight blue colouration |
| " | R600 | 1 hr | RT | Blue colouration |
| " | R440 | 1 hr | RT | No colouration |
| " | R440 | 1hr | 85°C | Slight blue colouration |
| " | R440 | 24 hr | RT | No colouration |
| " | R440 | 68 hr | RT | Slight colouration |
| " | Kynar Aquatec | 24 hr | RT | No colouration |
| ZLI 1840 / S428 | R440 | 1 hr | RT | No colouration |

FIG. 5

ELECTROLUMINESCENT DISPLAYS

This application is the National Stage of International Application No. PCT/GB2007/004805, filed Dec. 14, 2007, and claims the benefit of GB Application No. 0625114.4, filed on Dec. 16, 2006, both of which are incorporated by reference in their entirety.

This invention is concerned with electroluminescent displays, and more specifically to displays that are electroluminescent/liquid crystal hybrids.

Certain materials are electroluminescent—that is, they emit light, and so glow, when an electric field is generated across them. The first known electroluminescent materials were inorganic particulate substances such as zinc sulphide, while more recently-found electroluminescent materials include a number of small-molecule organic emitters known as organic light emitting diodes (OLEDs) and some plastics—synthetic organic polymeric substances—known as light-emitting polymers (LEPs). Inorganic particulates, in a doped and encapsulated form, are still in use, particularly when mixed into a binder and applied to a substrate surface as a relatively thick layer; LEPs can be used both as particulate materials in a binder matrix or, with some advantages, on their own as a relatively thin continuous film.

This electroluminescent effect has been used in the construction of displays. In some types of displays an electroluminescent (EL) material—generally referred to in this context as a phosphor—is provided to form a backlight which can be seen through a mask that defines whatever characters the display is to show. In other types, the displays are arranged with shaped electrodes such that small individual areas of EL material can be selectively activated. These displays have many applications; examples are a simple digital time and date display (to be used in a watch or clock), a mobile phone display, the control panel of a household device (such as a dishwasher or washing machine), and a handheld remote controller (for a television, video or DVD player, a digibox, stereo or music centre or similar entertainment device).

International patent application No: WO 2005/0121878 describes an electroluminescent display with a Liquid Crystal (LC) mask that is switchable in individual areas, between "on"/transparent (so that the backlight can shine therethrough) and "off"/opaque (so that the backlight's light is blocked thereby). The LC mask and the EL backlight are formed as a single integral unit wherein both components (the LC mask and EL backlight) are supported on a single substrate—the EL backlight being created as an electroluminescent material layer mounted directly on/behind the layer of liquid crystal material.

It will be appreciated that it is essential that the LC material be in a physically-stabilised form rather than in the normal "liquid", mobile, form implied by its name.

The inventor has realised that a polymer dispersed liquid crystal (PDLC) film consisting of droplets of liquid crystal, typically nematic or cholestic in nature, dispersed in a polymer matrix (binder) is suitable for the LC mask of such a hybrid display.

By including a dichroic dye in the PDLC, the unpowered state can be strongly absorbing as well as scattering, whilst the powered state combines transparency with low absorption. This type of PDLC is known as NCAP (entrapped nematic curvilinear aligned phase) and the inventor has found the NCAP type of PDLC to be particularly suitable for use as the LC material in the display. In particular, NCAP PDLCs minimise dye migration into the binder, and so do not degrade the achievable contrast.

These films can be constructed using an emulsification method, or by using one of a number of phase separation techniques. The emulsification method uses mechanical shear to disperse dyed liquid crystal (an organic oil) into an aqueous-based medium comprising a water-soluble polymer, for example polyvinyl alcohol (PVA), that is to form the polymer matrix.

The formation of the display can be achieved by a number of methods. WO 2005/0121878 discloses a method wherein each of the various layers is screen-printed into place (apart from the ITO front electrode, which is usually sputtered onto the substrate), through masks that define the shape, size and position of each layer of the display, using suitable pastes that are subsequently dried, set or cured, as appropriate, prior to the next layer or collection of layers being applied.

The inventor has found that using an NCAP PDLC material with PVA as a binder is unsatisfactory because, even though the PVA is an excellent binder, providing very stable emulsions, it absorbs water readily from the atmosphere, which in turn degrades the electro-optic performance of the PDLC through water dependent leakage currents. Accordingly, displays manufactured using PVA as a binder in the LC layer have poor environmental stability, which can result in defects, such as spotting of the display.

According to a first aspect of the invention there is provided an electroluminescent display comprising a mask defining the information to be displayed mounted in front of an electroluminescent (EL) material backlight, the mask comprising a layer of liquid crystal vesicles encapsulated in a radiation curable polymer matrix, wherein polymer chains of the polymer matrix have been cross-linked (cured) by exposure to radiation.

It has been found that curing the polymer matrix by exposure to radiation increases the environmental stability of the electroluminescent display and improves the electro-optic behaviour of the display. It is believed that the increased environmental stability is a result of the cross-linking of polymer chains caused by (not simply assisted by) the exposure to radiation. Cross-linking of polymer chains can also be achieved chemically, however it has been found that such chemical cross-linking alone does not achieve the same increase in environmental stability as radiation induced cross-linking.

It will be understood that the term "front" as used herein means the side of the display from which the display is to be viewed.

The radiation curable polymer matrix may be any one of water based, monomer free radiation curable urethane oligomer dispersions; acrylic functional polyurethane dispersions and acrylic urethane emulsions. In the most preferred embodiment, the polymer matrix is a UV curable polymer matrix, for example a UV curable aliphatic polyurethane resin, such as those supplied by DSM Neoresin under the trade names NeoRez® R440, R440, R445, R401 and R501. However, it is believed that the matrix may comprise other film forming UV curable polymers, for example, UV curable polyurethane dispersions (known in the art as UV-PUD), acrylic dispersions, silicones and mixtures therefore. The matrix resin can be formed from an aqueous solution or emulsion that contains very low levels, and preferably no, co-solvent.

Preferably, the polymer matrix comprises substantially no PVA. The term "substantially no PVA", means the polymer matrix comprises less than 5% PVA, preferably less than 1% PVA and most preferably, no PVA.

A number of different component materials could be used to form a shell of the vesicles. One example of a pair of component materials that may be used for the shell is a multifunctional iscocyanate (e.g. Desmodur N3200—sold by Bayer) and a diamine, such as ethylene diamine. The reaction may be catalysed by a tertiary amine, such as DABCO or other catalysts known to those skilled in the art.

According to a second aspect of the invention there is provided a method of manufacturing a display comprising the steps of:

forming a mask defining the information to be displayed by coating a substrate with a layer of liquid crystal vesicles encapsulated in a radiation curable polymer matrix and exposing the polymer matrix to radiation to cause cross-linking of the polymer chains of the polymer matrix; and forming an electroluminescent layer behind the mask.

The method of the invention is advantageous as it forms a display having increased environmental stability.

It is believed that the increased environmental stability is a result of the curing of polymer matrix with radiation.

In a preferred arrangement, the liquid crystal vesicles are formed in an aqueous medium comprising two component materials, one soluble in the aqueous medium and the other soluble in the liquid crystal, wherein a reaction of the components at an interface between the liquid crystal and aqueous medium forms a shell of each liquid crystal vesicles. The reaction of the components results in an emulsion of liquid crystal vesicles in an aqueous medium. Preferably, the component materials are multifunctional iscocyanate (e.g. Desmodur N3200—sold by Bayer) and a polyfunctional amine or alcohol, in particular a diamine such as ethylene diamine. The reaction may be catalysed by a tertiary amine, such as DABCO.

Preferably, the method comprises stabilising the aqueous medium during the reaction with a PVA solution. However, as discussed above, the presence of PVA in the LC layer can result in defects due to the PVA absorbing water from the atmosphere. Therefore, in a preferred arrangement, after a reaction phase, the PVA solution is removed from an emulsion produced by the reaction. The PVA solution may be removed from the emulsion using a centrifuge to separate the emulsion and PVA solution. Once the PVA solution and emulsion are separated, the majority of the PVA solution can simply be skimmed off the top of the emulsion. Removal of substantially all of the PVA solution may be ensured by repeatedly washing of the emulsion with a PVA solution of decreasing concentration and finally water.

The polymer matrix may comprise any suitable radiation curable polymer, as listed in association with the first aspect of the invention. Preferably, the polymer matrix comprised UV curable polyurethane.

According to a third aspect of the invention, there is provided an electroluminescent display comprising a mask defining the information to be displayed mounted in front of an electroluminescent (EL) material backlight, the mask comprising a layer of liquid crystal material dispersed in a polyurethane matrix.

According to a fourth aspect of the invention, there is provided a method of manufacturing a display comprising the steps of:

forming a mask defining the information to be displayed by coating a substrate with a layer of liquid crystal material dispersed in a polyurethane matrix; and forming an electroluminescent layer behind the mask.

It has been found that a polyurethane matrix provides a display with better environmental stability than other polymer matrixes.

It will be understood that that the features of each aspect of the invention may be combined with the features of other aspects of the invention.

In all aspects of the invention, notionally the LC material might be any one of the main types of such material—such as nematic and cholesteric or chiral nematic—the requirement is, generally, for a liquid-crystal-based material that allows polariserless high contrast electro-optical shuttering operation between a field "on" state that is optically transmissive and a base field "off" state that is less transmissive than the "on" state. Preferably, the liquid crystal contains a dye. In one arrangement, the liquid crystal includes up to 6% by weight of a dye, preferably a dichroic dye. In a preferred arrangement, levels of dye in the liquid crystal are 3-5% by weight. The dye attaches to the liquid crystal molecules and acts to obscure light when no field is applied across the LC material but when a field is applied, the dye molecules are aligned for allowing the transmission of light.

Using such a material, the combination of a liquid crystal shutter in front of an electroluminescent display results in a hybrid display that not only emits light when activated but also changes reflectivity when activated. This type of hybrid display can have good visibility in a very large range of lighting conditions—from pitch darkness to full sunlight (typically considered the highest ambient light conditions).

There is another significant advantage related to nematic materials: selection of a liquid crystal material which absorbs light in the absence of an electric field and transmits light when an electric field is present allows the same electric field to be used to drive the electroluminescent material as is used to drive the liquid crystal material. In the absence of an electric field, the liquid crystal material absorbs incident ambient light and the electroluminescent material does not generate any light so the display element appears dark. When an electric field is applied, the liquid crystal transmits both incident ambient light, which subsequently reflects back out off the electroluminescent layer behind it, and also the light now generated by the electroluminescent layer, so the display appears light.

The LC mask and the EL backlight may be constructed as a single entity. By this, it is meant that the LC mask is adhered to the EL backlight or sandwiched between layers of the display to be immovable with respect to the backlight.

From the front to back the backlight comprises:

an electrically-insulating transparent front layer known as the substrate, usually made of glass or plastic, such as polyethylene terephthalate (PET) or polyethylene naphthalate (PEN);

a first electrically-conductive film, for example, made from a material such as indium tin oxide (ITO), forming one electrode—the front electrode—of the backlight;

an electroluminescent (EL) phosphor material (usually a particulate phosphor within a binder matrix);

an electrically-insulating layer of a material—usually a ceramic—having a relatively high dielectric constant (relative permittivity) of around 50 (in some applications, such as the present invention, this layer is most desirably significantly optically-reflective, while in others it preferably has low reflectivity); and disposed over the rear face of the electrically-insulating layer, an electrically conductive film forming a second electrode-conductive film forming a second electrode—the rear electrode—of the backlight.

The LC mask is preferably located between the layer of EL material and front electrode such that, in use, the electrodes generate an electric field across both the layer of EL material and the LC mask. However, alternatively, the LC mask and layer of EL material may be activated by separate electrodes.

While the LC mask can be created as a layer mounted directly on/behind the layer of EL material, it is possible to provide a polymer interlayer between the LC mask and EL backlight.

For the most part, a display of the invention most conveniently incorporates disposed over the entire rear face of the substrate a single (front) electrode, and disposed over the rear face of the reflective electrically-insulating layer a patterned (rear) defining which areas of both the liquid crystal layer and the electroluminescent layer can be selected to be switched "on" or "off". However, it is possible as an alternative to pattern the front electrode and to have a single "whole-face" rear electrode. Moreover, it is possible for both electrodes to be patterned—as will need be the case if the display is going to be a matrix device where a multitude of very small areas can be illuminated at will so as to enable almost any shape and size of displayed image simply by selecting which areas are lit and which are dark.

An embodiment of the invention is now described, though by way of illustration only, with reference to the accompanying drawings in which:

FIG. 4 is a table illustrating the humidity performance for PDLC materials comprising different polymers; and FIG. 5 is a table illustrating the temperature performance for PDLC materials comprising different polymers.

Figure 1:
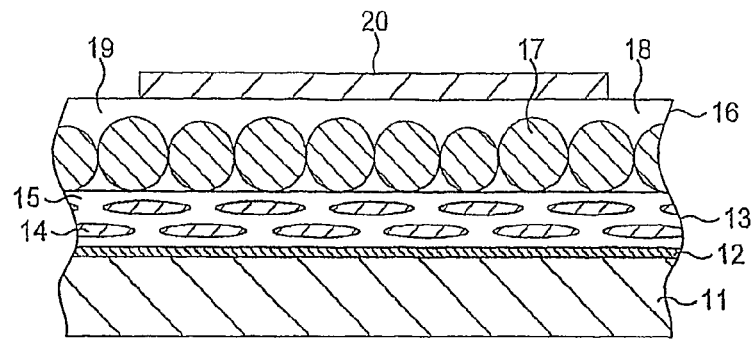
FIG. 1 shows a section through a display according to a first embodiment of the invention.

The structure of the first embodiment of the display of the invention depicted in FIG. 1 of the accompanying drawings can be seen to be, from front to back:

a relatively thick protective electrically-insulating transparent front layer (11; the substrate);

over the rear face of the substrate 11, a very thin transparent electrically-conductive film (12) forming the front electrode of the display;

covering the rear face of the front electrode 12, a relatively thin layer (13) of LC material (14) physically-stabilised by being dispersed within a supporting polymer matrix (15);

formed directly on, and covering the rear face of, the liquid crystal layer (13), a relatively thin layer (16) of electroluminescent/phosphor material (17) dispersed within a supporting matrix (18);

over the rear face of the phosphor layer (16), a relatively thin optically-reflective electrically-insulating layer (19) of a relatively high dielectric constant material (in the Figure this layer is shown as a seamless extension of the phosphor layer (16); and disposed over the rear face of the reflective electrically-insulating layer (19), an electrically-conductive film (20) forming the rear electrode(s) of the display.

The front and rear electrodes together define discrete areas of both the liquid crystal layer and the electroluminescent layer that can be selected to be switched "on" or "off".

In addition, the back electrode layer may be covered with a protective film (not shown here).

It will be understood that the term "relatively thick" means thicknesses in the range of 30 to 300 micrometers. Furthermore, it will be understood that the term "relatively thin" means thicknesses of 50 micrometers or less. In a preferred embodiment, the relatively thick layers are around 100 micrometers and the relatively thin layers are 25 mircometers or less.

The dielectric constant of the electrically insulating layer may be around 50.

Figure 2:
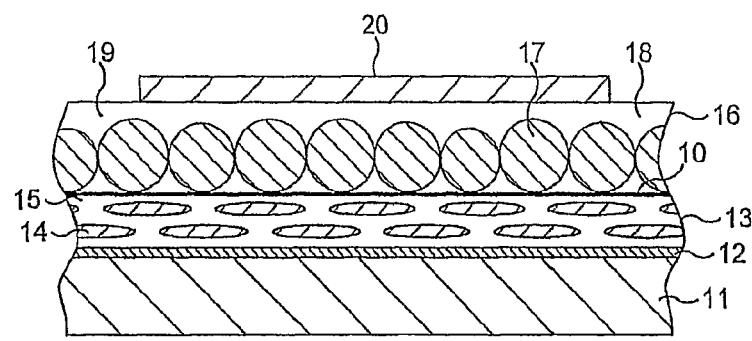
FIG. 2 shows a section through a display according to a second embodiment of the invention.

In an alternative embodiment, shown in FIG. 2 of the accompanying drawings, the EL and LC materials are not directly formed on one another, but are instead separated by an insulating interlayer (10). In all other aspects, the embodiments are the same and common reference numerals have been used.

Figure 3:
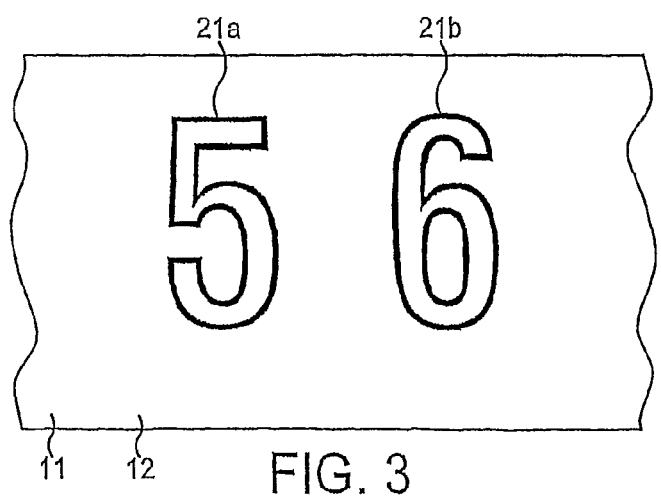
FIG. 3 shows a display according to either embodiment in plan view.

FIG. 3 is an example of the types of information that may appear on the display.

The PDLC material of the display is formed by an emulsification method in which initially liquid crystal droplets are dispersed in an aqueous medium. The liquid crystal droplets are dispersed using high mechanical shear, for example, using a 4 cm diameter impeller running at 3000 rpm for 8 to 10 minutes. This achieves micron-sized droplets of liquid crystal that have been found to produce acceptable performance in the resultant display.

The liquid crystal droplets include a component that is soluble in the liquid crystal, such as multifunctional isocoyanate, and after the emulsion has been formed a water soluble polyfunctional alcohol or amine, such as ethylene diamine, is added to the bulk aqueous phase. A catalyst such as a tertiary amine, for example 1,4-diazabicyclo[2.2.2]octane (DABCO) or a tin compound such as dibutyl tin dilaurate, may be used to promote the reaction between these components. These two components subsequently react at the interface between the liquid crystal droplets and the aqueous medium to form a shell around the liquid crystal droplets, thus forming an emulsion of liquid crystal vesicles in the aqueous medium.

The aqueous medium includes a PVA solution that is used to stabilise the emulsion (maintain the liquid crystal droplet size and prevent separation of the liquid crystal and aqueous medium) during the reaction phase of the two components that form the shell of the liquid crystal vesicles. The reaction phase is chosen as appropriate and typically may be between 4 and 9 hours. At the end of the polymerisation an aliquot of aqueous ammonia solution, typically 10% concentration, is added to quench any unreacted isocyanate moeties.

Once the vesicle formation phase is complete, a centrifuge is used to separate the PVA solution from the emulsion and the PVA removed by skimming the PVA solution that has been separated off the top of the emulsion. Next, the emulsion is washed first with PVA solutions of decreasing concentration and then with water to remove any traces of PVA solution that remain on the emulsion. Washing the emulsion first with PVA solutions of decreasing concentration, rather than water, prevents shocking the separated emulsion, which could cause the PVA to separate from solution and hence contaminate the separated vesicles.

The emulsion with PVA removed is then mixed with the UV curable polyurethane binder that is to form the matrix in which the liquid crystal vesicles are encapsulated. A photo-initiator required to promote the UV curing reaction is added at this stage, together with an additional coating aid or surfactant as well as other necessary additives. A PDLC layer can then be formed by coating and drying the mixture on a substrate.

The display is formed by sequential deposition of the layers of the display using a process such as screen-printing. Typically, the PDLC layer is formed first by coating and drying the PDLC emulsion on a conductive substrate that forms the front electrode. The PDLC layer is then exposed to UV light, which cures the polyurethane matrix. The layers that form the EL backlight are then deposited onto the cured PDLC layer.

It has been found that a display having a PDLC layer in which the polymer matrix is cross-linked through exposure to ultra-violet light exhibits improved environmental stability. The excellent environmental stability has been illustrated by humidity and temperature tests, the results of which are shown in FIGS. 4 and 5. These tests were carried out for a number of potential binders.

The humidity tests were carried out on a thin (approximately 10 mircometer) layer of binder material (including cross-link agent or photoinitiator) deposited onto ITO polyester. A standard EL test lamp pattern was then printed onto the binder. The test lamp pattern utilised conductive silver ink for the electrodes. The lamp was subsequently aged while being driven and the time for the lamp to degrade was noted. Degradation was considered to have occurred if there was a notable loss of contrast or spotting of the layer.

As can be seen from the results in FIG. 4, a polyurethane binder provided the best performance in the humidity tests taking over 6 hours to degrade.

The temperature tests were carried out on a thin layer of PDLC material (including cross-link, agent or photoinitiator) deposited on a glass microscope slide. A drop of liquid crystal was placed on the dried and cured film and left for a period of time. A jet of water was then used to wash the liquid crystal off the surface of the polymer and the polymer examined visually to determine the extent to which the dye/liquid crystal has diffused into the film.

As can be seen from FIG. 5, R440 (the UV cured polyurethane) provides excellent temperature performance (along with Kynar Aquatec), showing no colouration after exposure to room temperature for 24 hrs and only slight coloration after 68 hrs.

The humidity and temperature tests therefore show that the UV cured polyurethane binder has excellent environmental stability.

EXAMPLE 1

A stock solution of nematic liquid crystal BL006 (Merck Chemicals) containing 2% black dye S428 (Mitsui Chemicals) was prepared by adding 1 gm of S428 to 49 gm of BL006 and stirring the mixture at approximately 60° C. for 1 hour. The mixture was placed in an oven at 60° C. for a further 18 hrs, before cooling to room temperature and filtering through a 0.2 micron filter. Desmodur N3200 (Bayer) (1.8 gm) was added to a portion of the dyed liquid crystal (36 gm) and the mixture stirred at 60° C. until a homogeneous solution was produced (approx 10 minutes). This solution was then added to a stirred (350 rpm, 4 cm diameter impeller) 10% polyvinyl alcohol (Celvol 205, Celanese Chemicals) (120 gm) maintaining the temperature at 50° C. by means of a recirculating water bath. After the addition was complete, impeller speed increased to 3000 rpm and maintained for 8 minutes at which point it was reduced to 750 rpm. Temperature maintained at 50° C. and strirring continued for a further 8 hours. During this time a mixture of 10% DABCO (Sigma Aldrich) (2.88 gm) and 10% ethylene diamine (Sigma Aldrich) (2.44 gm) was added in 7 portions at approximately 30 minute intervals. 10% aqueous ammonia solution (2.84 gm) was added dropwise over a period of 3 minutes, stirring speed reduced to 500 rpm and emulsion allowed to cool to room temperature overnight.

The resulting emulsion was filtered through a 20 micron filter under slight pressure, before centrifuging at 3600 rpm to separate the liquid crystal vesicles. The supernatant liquid was removed, and the wet cake washed successively with 2% polyvinyl alcohol (twice), 1% polyvinyl alcohol, and water (three times). The weight and % solids of the wet cake so produced were 30.65 gm and 73.6% respectively.

A polyurethane matrix emulsion was prepared from the wet filter cake in the following manner. Neorad R440 (DSM Neoresins) was mixed with a sample of the wet filter cake to give an emulsion containing 55% non-volatiles, and 60% (based on non-volatile content) liquid crystal (including S428).

A mixture of Neorad R440, FC4430 (3M Company) and Darocur 1173 (Ciba Speciality Chemicals) was prepared by mixing the Neorad R440 and FC4430 together and then adding, whilst stirring Darocur 1173. The quantities of Neorad R440, FC4430 and Darocur 1173 being calculated such that when this mixture was combined with a portion of the Neorad/wet cake emulsion prepared above results in a final composition containing 50% total solids (non-volatiles), 1% Darocur 1173 (based on total Neorad R440) and 1% FC4430 (based on total emulsion). The resulting PDLC emulsion was filtered through a 20 micron filter, degassed in an ultrasonic bath for 15 minutes and then coated onto ITO-PET (Sheldahl) dried (approximately 10 minutes at 90 C) and UV cured to give a dry film of approx 15 micron thickness. An EL lamp construction was then printed onto the back of this film through the successive deposition of phosphor (DuPont 8153), 2 layers of dielectirc (DuPont 7153), insulator (DuPont 5018) and carbon (Coates XZ302 MV) using a screen printing process.

The electro-optic performance of three test lamps produced in this manner was characterised before and after aging at 60 C/95% relative humidity for 72 hours.

EXAMPLE 2

Following the method of example 1, a PDLC coating was prepared using BL093 (Merck Chemicals) in place of BL006. The final PDLC contained 60 wt % BL093 (including 3 wt % (based on BL093) S428).

The invention claimed is:
1. A display device comprising:
a layer of liquid crystal vesicles encapsulated in a radiation curable polymer matrix including polymer chains that have been cross-linked by exposure to radiation; wherein
the radiation curable polymer matrix is produced from water-based radiation-curable urethane oligomer dispersions.
2. A display device according to claim 1, wherein the radiation curable polymer matrix includes at least one of a radiation curable polyurethane and a UV curable aliphatic polyurethane.
3. A display device according to claim 1, wherein the liquid crystal vesicles include a shell including a multifunctional iscocyanate and a polyfunctional amine or alcohol.
4. A display device according to claim 3, wherein the shell includes a diamine.
5. A display device according to claim 3, wherein the shell includes a diol.
6. A display device according to claim 1, wherein liquid crystal of the liquid crystal vesicles includes a nematic material.
7. A display device according to claim 1, wherein liquid crystal of liquid crystal vesicles contains a dye.
8. A display device according to claim 7, wherein the liquid crystal includes up to 6% by weight of the dye.

9. A display device according to claim 1, wherein the display device includes from front-to-back:
- an electrically-insulating transparent front layer;
- a first electrically-conductive film;
- the layer of liquid crystal vesicles encapsulated in a radiation curable polymer matrix;
- an electroluminescent phosphor material;
- an electrically-insulating layer having a relatively high dielectric constant; and
- a second electrically-conductive film.

10. A display device according to claim 9, further comprising a mask that includes the layer of liquid crystal vesicles encapsulated in a radiation curable polymer matrix; wherein
the first and second electrically-conductive films are arranged to generate an electric field across both the electroluminescent phosphor material and the mask.

11. A display device according to claim 10, wherein the mask is arranged directly on the electroluminescent phosphor material.

12. A display device according to claim 10, wherein an interlayer including a polymer is provided between the mask and the electroluminescent phosphor material.

13. A display device according to claim 1, further comprising:
- an electroluminescent material backlight; and
- a mask arranged to define information to be displayed mounted in front of the electroluminescent material backlight, and including the layer of liquid crystal vesicles encapsulated in a radiation curable polymer matrix.

* * * * *